Figure 1:
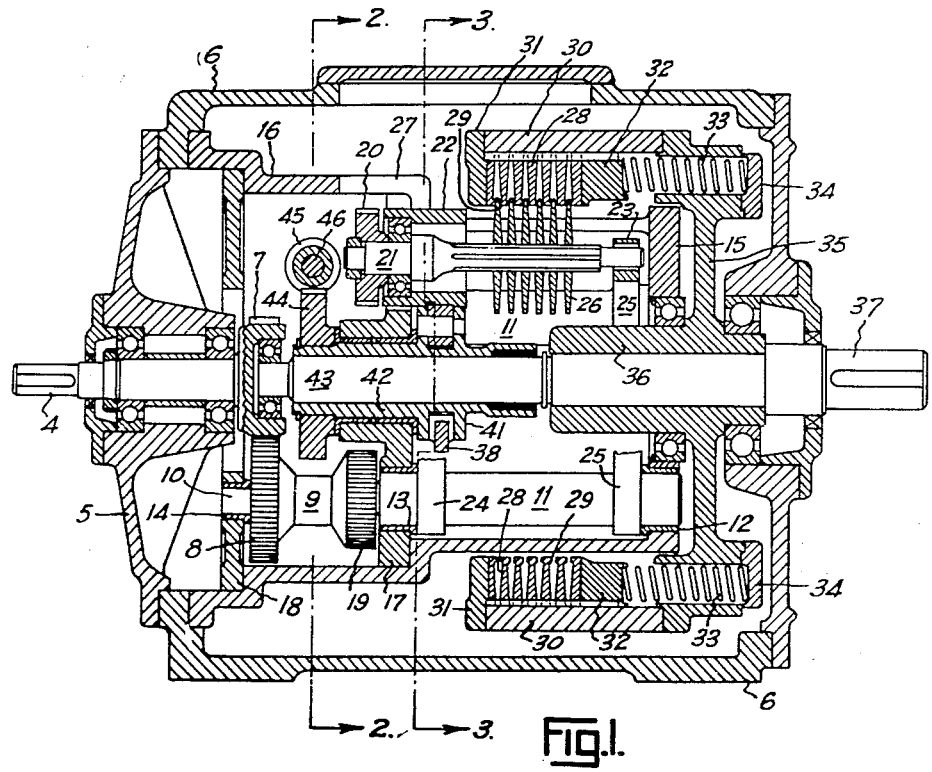

Dec. 20, 1955  O. H. JORGENSEN  2,727,397
STEPLESSLY VARIABLE SPEED TRANSMISSION GEAR
Filed May 22, 1952  2 Sheets-Sheet 1

INVENTOR
OSCAR HALFDAN JORGENSEN
BY Jewett, Mead, Browne
& Schuyler
ATTORNEYS

Dec. 20, 1955  O. H. JORGENSEN  2,727,397
STEPLESSLY VARIABLE SPEED TRANSMISSION GEAR
Filed May 22, 1952  2 Sheets-Sheet 2

INVENTOR
OSCAR HALFDAN JORGENSEN

BY Jewett, Mead, Browne
& Schuyler
ATTORNEYS

United States Patent Office 2,727,397
Patented Dec. 20, 1955

2,727,397

STEPLESSLY VARIABLE SPEED TRANSMISSION GEAR

Oscar Halfdan Jorgensen, St. Ives,
New South Wales, Australia

Application May 22, 1952, Serial No. 289,316

Claims priority, application Australia June 8, 1951

2 Claims. (Cl. 74—199)

This invention relates to steplessly variable speed transmission devices of the kind comprising, a driving shaft, a driven shaft, a frictional transmission element drive-connected to one of the shafts, and a coacting transmission element which is in frictional contact with the first element, and is variably interpenetrative relative thereto for the purpose of varying the driving speed ratio therebetween.

In a previously proposed gear of the kind referred to above, one of the transmission elements (driving or driven) consists of a plurality of coaxial obtusely double coned or radially thinned "discs" whereof the axial spacing is variable, and the other element consists of a plurality of discs which are variably interpenetrative relative to the coned discs, and have circumferential beadings which bear against and between the coned discs thus to transmit rotation by frictional contact therewith. To vary the drive speed ratio the degree of disc interpenetration is varied. This prior arrangement has the disadvantage that it can only be used for transmission of relatively light torsional loads; because, being (theoretically at least) a point contact frictional drive, application of a heavy load (together with maintenance of a constant drive ratio for only a short time) rapidly causes formation of step-like wear grooves in the coned discs. The presence of such grooves is objectionable because it immediately impairs the ability for steplessly variable transmission; and as well, lowers the transmissive efficiency by introduction of non-useful frictional load. This last mentioned loss is largely due to the fact that the transmissive surfaces closely approaching and just leaving the point of drive contact (by reason of the fact that the surfaces roll on opposite sides of the tangent through the contact point) scrape against each other with oppositely directed components of motion in what may be called a "scrubbing" action; and this trouble is aggravated by the fact that, if desired compactness is to be preserved, the driven and driving discs are necessarily of about the same diameter.

A further disability with the prior arrangement described above, is that the mentioned scrubbing action prevents maintenance of a lubricant film on the frictional drive surfaces. At first thought it might be considered that presence of lubricant upon frictional drive surfaces would be objectionable, but experiment which culminated in the present invention has shown that wherever frictional drive surfaces in other than pure rolling contact are concerned, some lubrication is necessary if scoring, disintegration and overheating of the drive surfaces are to be avoided.

Another disability of the mentioned prior arrangement is that in its frictional drive contacts between interleaved disc-like elements, the extremely low factor of resemblance to pure rolling contact, necessitates very heavy axially directed spring loadings on the discs, so to avoid uselessly low transmissive efficiency by slip losses. Such high spring loadings naturally increase the already present tendency (discussed above) for the rubbing surfaces to be short-lived due to wear scoring and the like.

One object of the present invention is to provide a steplessly variable drive gear of the kind described, wherein the components of scrubbing motion are codirected instead of oppositely directed as heretofore, thereby reducing both speed and amplitude of scrubbing contact between the friction drive surfaces to such a degree that those surfaces sufficiently approach a condition of pure rolling contact as to enable power transmission without limitation to light torsional loadings, without undue loss of efficiency in overcoming non-useful frictional loadings, without loss of effective lubrication of the frictional drive surfaces, and without excessive axial spring loading on the transmission elements; in other words, to endow a steplessly variable drive gear with a running efficiency and durability comparable with that hitherto obtainable only in stepped gear change units.

Briefly stated, the invention consists in a steplessly variable speed transmission device of the kind wherein two coacting frictional drive elements (respectively drive-connected to a driving shaft and a driven shaft) comprise at least three mutually axially displaceable parts, one of which, constituting one of the elements, is edgewisely penetrated, with sideward contact, between the other two parts constituting the other element, under an axially directed resilient loading applied to the element having the greater number of parts; characterised, in that one of the elements is annular and the other element is circular and is disposed and is movable wholly within and transversely of the cylindrical space which contains the outer periphery of the annular element.

An example of the invention is illustrated in the drawings herewith.

Figure 1 is a sectional side elevation of one practical embodiment of the invention. Figure 1 is not entirely a medial cross section. It may be regarded as having been taken along the line marked 1—1 in Figure 3.

Figure 2:
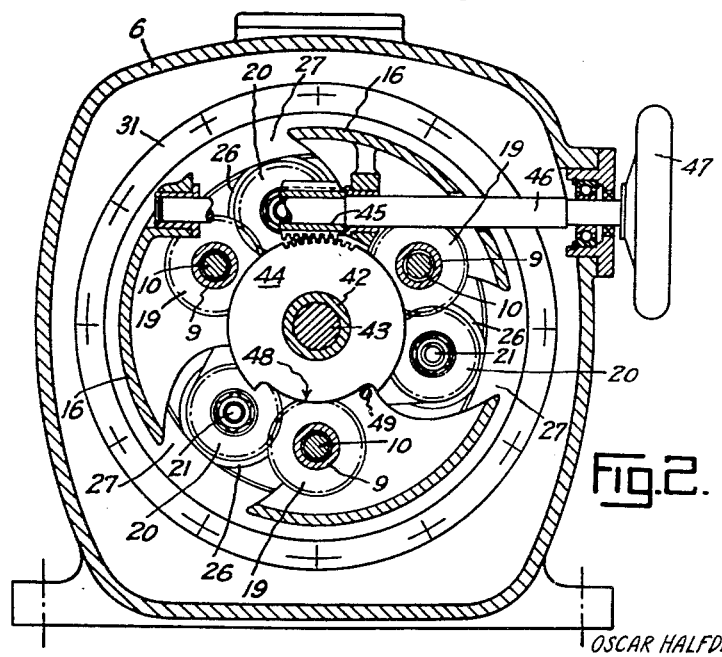
Figure 3:
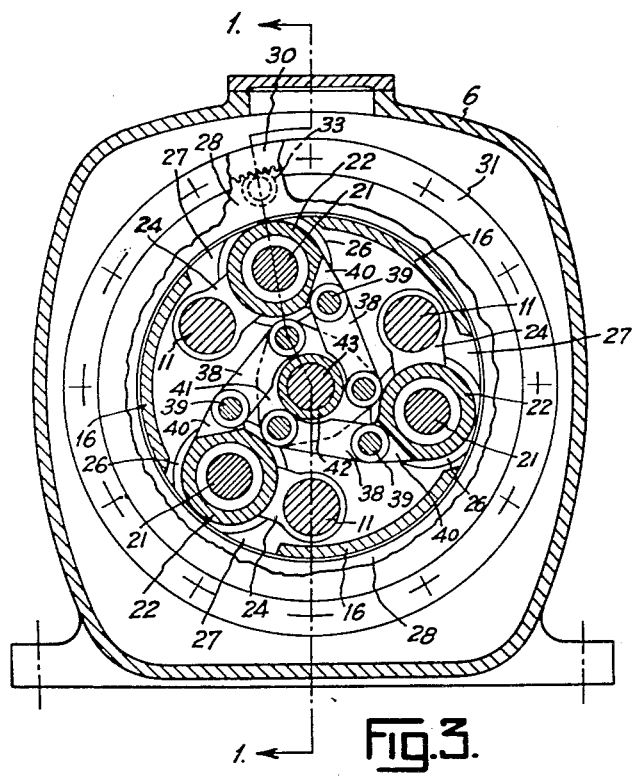

Figures 2 and 3 are sectional end elevations respectively taken along lines 2—2 and 3—3 in Figure 1. In all of the figures some background parts are omitted for clearness.

The driving shaft 4 (in bearings supported in a cover 5 forming part of a suitable casing 6) has a driving gear 7 fixed thereon. This gear meshes three equally spaced wheels 8 (only one of which appears in the drawings). These three wheels each form one end respectively of three idler bobbins 9. The bobbins are freely revoluble upon shafts 10 which extend from rock-shafts 11. The three rock-shafts (including their extension shafts 10) are freely borne in bearings 12, 13 and 14 respectively mounted in the end plate 15 (of a support cake 16 fixed to the casing 6) and support plates 17 and 18 fixed in the cage 16.

Each of the idler bobbins carries a second wheel 19. The second wheels 19 respectively mesh three driven pinions 20. The pinions 20 are respectively fixed upon three splined shafts 21 borne in bosses 22 and 23 on the ends of arms 24 and 25 fixed to or integral with the rock shafts 11.

Each of the splined shafts 21 carries a plurality of obtusely double coned or otherwise radially thinned discs 26 which are axially movable along the shafts 21 and rotatable at one therewith. The discs 26 (which project through gaps 27 in the cage 16) constitute one of the two frictional transmission elements. All of the discs frictionally coact with the other transmission element which consists of annular rings 28 whereof the sides adjacent the inner peripheries are beaded (29) for sideward contact upon the discs 26. The outer peripheries of the annuli are toothed for keyed but axially displaceable driving engagement with an internally splined yoke ring 30.

The annuli 28 are subjected to axially directed resilient loading by being stacked between a retaining ring 31 fixed on the yoke ring 30 and a thrust ring 32 against which a plurality of compression springs 33 are imposed. The springs 33 are backed by a backing ring 34 which is fixed to a carrier plate 35 to which the yoke ring 30 is also fixed. The carrier plate 35 is fixed to or integral with a sleeve 36 keyed upon a driven shaft 37.

Earlier herein the frictional transmission elements are referred to as consisting of "mutually axially displaceable" parts. Reference to Figure 1 will show that one of the parts (namely the leftmost annulus 28) does not need to be axially displaceable relative to the yoke, but that does not affect the truth of the statement "mutually axially displaceable" because all of the parts are so displaceable in the relative sense of each being displaceable relative to the others.

Means are provided to limit the swing movement of the rock shafts 11 so as to ensure that at all times the discs 26 remain partly sandwiched between the beads 29 on the annuli 28. These means may consist of stop pins, abutments or the like fixed on the cage 16 or any other convenient stationary part of the unit, or they may consist of a slotted or gapped wheel which engages a fixed stop pin and which is linked to the rock shafts 11 as described later herein.

The mechanism thus far described will operate automatically to vary the speed of the driven shaft 37 inversely to the loading torque imposed thereon. For such automatic use however, experiment has shown that the input shaft (such as 4) must be used as the driving shaft. It cannot be used as a driven or power output shaft in the manner referred to later herein in connection with manual selection of required gear ratio.

When the device (as so far described), is employed as an automatic gear ratio selector, rotation of the power input shaft 4 causes all of the discs 26 to rotate; and, assuming the output shaft 37 is lightly loaded, it will be rotated at the top speed ratio of which the unit is capable; that is, without intrusion of the discs 26 between the annuli 28, beyond the minimum amount (as shown in Figure 1) allowed by the swing limit stop devices associated with the rock shafts 11. The first effect of load increase on the output shaft is a tendency to slow down the rotational speed of the annuli 28 with a consequent tendency for slippage between the discs and the annuli and momentary rotation thereof at different speeds. Experiment has shown that with such tendency to slip at different speeds, the discs, of their own accord, climb more deeply between the annuli, so that the spring loading on the annuli stack is increased thus to reduce slippage; and torque amplification follows the automatic assumption by the discs of a lesser effective radius. When the loading on the output shaft is again relaxed the discs 26 automatically recede from the annuli, so that a floating automatic selection of gear ratio thus obtains.

Where a particular speed ratio between the driven and driving shafts is required to be maintained, or varied only at the will of the user, means are provided for holding the rockshafts stationary at any selected point in their swing range. These means comprise (for example) three links 38 which at one end are respectively pivotally connected (at 39) to lugs 40 on the bosses 22. The other ends of the links are pivotally connected to a crank plate 41. This crank plate is fixed on a control sleeve 42 freely revolubly mounted (for convenience) on an extension 43 of the driven shaft 37.

A worm wheel 44 is keyed on the control sleeve, and this wheel is meshed by a worm pinion 45 on control shaft 46 which is provided with a control hand wheel 47.

Turning of the hand wheel 47 will vary the angular disposition of the rock shafts, and hence the degree to which the discs 26 intrude between the annuli 28. The presence of the worm and pinion (45, 44) ensures retention of any selected degree of disc intrusion.

The worm wheel 44 may be conveniently used as a part of the limit stop devices which determine the movement range for the rock shafts. The wheel 44 is not called upon to make a full revolution in turning the rock shafts, therefore it doesn't need teeth throughout its circumference. Part of that circumference is gapped as shown at 48. The gap has a stationary stop pin 49 extending therethrough. This pin may be supported by having its ends respectively fixed in the support plates 17 and 18.

With the manual control gear installed as just described either the shaft 4 or the shaft 37 may be used as power input shaft depending upon whether speed reduction or speed increase gear ratios are required.

It will probably be convenient to standardize production of the gear unit subject hereof with a manual control gear included so that all units will then be usable for manual or automatic control as the user may require. For changeover to automatic control it would only be necessary to remove the worm pinion 45, keeping in mind, of course, that when the unit is on automatic control the shaft 4 must be the power input shaft.

It is emphasised that the gear unit shown in the drawings is set forth purely by way of example, as there may be considerable modification of mechanical detail without departure from the essence of the invention. For example:

(a) The worm wheel and pinion (44 and 45) may be replaced by a lever fixed on the control sleeve 42 and carrying a trunnion not engaged by a screw thread on a control shaft similar to that numbered 46.

(b) In the drawings the discs 26 are radially thinned, and the annuli 28 have drive contact beads 29 thereon. This arrangement may be reversed; that is, the discs may be circumferentially beaded and the annuli radially thinned.

(c) In the drawings the discs 26 are shown to exist in three equally spaced groups. There may be more than or less than three of such groups. For the transmission of very light loads it is possible that only one such group would suffice, but in most cases that would not be preferred owing to the resulting unbalanced application of torque to the driven annuli and parts associated therewith.

(d) In the drawings each group of discs 26 is shown to contain six discs (which coact with seven annuli). The number of discs may be greater or less than six. In a light load transmission there may be as few as two annuli embracing a single disc or a single annulus which is embraced by a pair of discs. In the latter case it would, of course, be necessary to apply the axial resilient loading (such as that due to springs 33) to the discs instead of to the annular member or members. This could be arranged by sleeving springs upon the splined shaft or shafts (such as 21). In other words the transmission elements (both driving and driven) may total as few as three parts, provided one of the parts is sandwiched between the other two for sideward contact therewith; provided one of the elements (consisting of one or two parts) is annular and the other element (consisting of two parts or one part) is circular; and provided an axially directed resilient loading is applied to the element having the greater number of parts.

(e) In the drawings the discs 26 are radially thinned, by being formed as double or back-to-back obtuse cones, so that the radial profile is a straight line. It will be understood that this profile line may be part of a parabola or other curve.

I claim:

1. A steplessly variable speed transmission device comprising, in combination, a driving shaft which is rotatable about a fixed axis, a plurality of rock shafts equally circumferentially spaced about said axis, a splined shaft rotatably mounted on each of said rock shafts, a gear train from said driving shaft to each of said splined shafts, a plurality of radially thinned driving discs axially displaceably keyed on each of said splined shafts, a coaxial stack of beaded driven annuli which surrounds all of said driving discs and said rock shafts, means for retaining said driving discs interleaved with said annuli, a yoke ring within which all but one of said annuli are axially displaceably keyed, a driven shaft which is constrained to rotate about said fixed axis and to which said yoke ring is keyed, means carried by said yoke ring for imposing an axially directed resilient load upon said stack of annuli, links which at one end are respectively pivoted to said rock shafts, a crank plate mounted about said fixed axis and to which the other ends of said links are pivotally connected, and mechanism for rotationally adjusting and retention of selected adjustment of said crank plate about said axis.

2. A transmission device according to claim 1 wherein said mechanism for rotationally adjusting said crank plate and said means for retaining said driving discs interleaved with said annuli comprise, a worm wheel keyed to said crank plate and having a gap therein, a stationary stop pin lying in said gap, a worm pinion which meshes said worm wheel, and a control shaft whereon said pinion is keyed.

References Cited in the file of this patent

UNITED STATES PATENTS

| | | |
|---|---|---|
| 1,823,226 | Abbott | Sept. 15, 1931 |
| 2,216,642 | Davis | Oct. 1, 1940 |
| 2,222,281 | Beier | Nov. 19, 1940 |
| 2,253,750 | Beier | Aug. 26, 1941 |
| 2,583,496 | Rougelot | Jan. 22, 1952 |